US011739631B2

(12) United States Patent
Balan et al.

(10) Patent No.: US 11,739,631 B2
(45) Date of Patent: Aug. 29, 2023

(54) METHODS AND SYSTEMS FOR DETERMINING RESERVOIR AND FRACTURE PROPERTIES

(71) Applicant: Saudi Arabian Oil Company, Dhahran (SA)

(72) Inventors: Huseyin Onur Balan, Katy, TX (US); Anuj Gupta, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 147 days.

(21) Appl. No.: 17/076,206

(22) Filed: Oct. 21, 2020

(65) Prior Publication Data

US 2022/0120173 A1 Apr. 21, 2022

(51) Int. Cl.
*E21B 47/06* (2012.01)
*G06F 30/20* (2020.01)
(Continued)

(52) U.S. Cl.
CPC .............. *E21B 47/06* (2013.01); *E21B 33/12* (2013.01); *E21B 43/26* (2013.01); *E21B 47/135* (2020.05);
(Continued)

(58) Field of Classification Search
CPC ........ E21B 47/06; E21B 47/135; E21B 33/12; E21B 43/26; E21B 49/008; G06F 30/20; G01V 99/005
(Continued)

(56) References Cited

U.S. PATENT DOCUMENTS 3,586,105 A * 6/1971 Johnson .................. E21B 43/26
166/308.1
4,391,337 A * 7/1983 Ford ...................... E21B 43/117
166/299
(Continued)

FOREIGN PATENT DOCUMENTS

| CN | 104727799 A | 6/2015 |
| CN | 107420081 A | 12/2017 |
| CN | 109083624 A | 12/2018 |

OTHER PUBLICATIONS

Ramos et al. ("Development and Testing of Advanced Inter-Well Pressure Pulse Analysis for Fracture Diagnostics in Tight Gas Reservoirs", ARAM 2018, pp. 1-18). (Year: 2018).*
(Continued)

*Primary Examiner* — Iftekhar A Khan
(74) *Attorney, Agent, or Firm* — Bracewell LLP; Constance G. Rhebergen; Keith R. Derrington

(57) ABSTRACT

Methods and systems for determining reservoir permeability of a subsurface formation and fracture surface area. The method includes creating a first hydraulic fracture and a second hydraulic fracture in a horizontal well, generating a pressure pulse at the first hydraulic fracture, monitoring, using a first pressure gauge the pressure at the first hydraulic fracture, monitoring, using a second pressure gauge, the pressure pulse at the second hydraulic fracture, repeating this test at different locations along the wellbore to evaluate heterogeneity in permeability and variations in fracture surface areas, analyzing pressure and rate data to determine either permeability or fracture surface area by using: analytical/numerical simulation models, or physics-based proxy models inputting pressure front/peak arrival time or peak pressure.

12 Claims, 13 Drawing Sheets

(51) Int. Cl.
  *E21B 47/135* (2012.01)
  *E21B 33/12* (2006.01)
  *E21B 43/26* (2006.01)
  *E21B 49/00* (2006.01)
  *G01V 99/00* (2009.01)
  *G06F 111/10* (2020.01)

(52) U.S. Cl.
  CPC .......... *E21B 49/008* (2013.01); *G01V 99/005* (2013.01); *G06F 30/20* (2020.01); *E21B 2200/20* (2020.05); *G06F 2111/10* (2020.01)

(58) Field of Classification Search
  USPC .......................................................... 702/2
  See application file for complete search history.

(56) References Cited

U.S. PATENT DOCUMENTS

| | | | | |
|---|---|---|---|---|
| 4,858,130 | A * | 8/1989 | Widrow | E21B 49/00 73/152.58 |
| 5,005,649 | A * | 4/1991 | Smith | E21B 34/063 166/308.1 |
| 5,070,457 | A * | 12/1991 | Poulsen | E21B 49/008 702/12 |
| 5,228,510 | A * | 7/1993 | Jennings, Jr. | E21B 43/26 166/308.1 |
| 6,876,959 | B1 * | 4/2005 | Peirce | E21B 43/267 702/14 |
| 7,559,373 | B2 * | 7/2009 | Jackson | E21B 43/006 166/308.1 |
| 7,740,069 | B2 * | 6/2010 | Young | E21B 43/263 166/308.1 |
| 8,061,427 | B2 * | 11/2011 | Jackson | E21B 43/006 166/250.1 |
| 9,057,261 | B2 * | 6/2015 | Walters | E21B 43/248 |
| 9,840,898 | B2 * | 12/2017 | Kasevich | E21B 43/26 |
| 9,915,137 | B2 * | 3/2018 | Alekseenko | E21B 43/26 |
| 10,392,916 | B2 * | 8/2019 | Moos | E21B 43/263 |
| 10,494,918 | B2 * | 12/2019 | Coenen | E21B 47/06 |
| 10,641,090 | B2 * | 5/2020 | Felkl | G01V 99/005 |
| 10,689,970 | B2 * | 6/2020 | Williams | G01H 9/00 |
| 11,015,436 | B2 * | 5/2021 | Adamopoulos | G01V 1/308 |
| 11,434,730 | B2 * | 9/2022 | Surjaatmadja | E21B 43/114 |
| 2003/0079877 | A1 * | 5/2003 | Wellington | E21B 43/30 166/272.1 |
| 2009/0065253 | A1 * | 3/2009 | Suarez-Rivera | E21B 43/26 166/250.1 |
| 2011/0257944 | A1 * | 10/2011 | Du | E21B 43/267 703/2 |
| 2013/0032349 | A1 * | 2/2013 | Alekseenko | E21B 43/26 166/308.1 |
| 2014/0014338 | A1 * | 1/2014 | Crews | E21B 43/26 166/308.1 |
| 2014/0083687 | A1 * | 3/2014 | Poe | E21B 49/00 166/250.1 |
| 2014/0262239 | A1 * | 9/2014 | Keller | E21B 43/267 166/308.1 |
| 2016/0003020 | A1 * | 1/2016 | Sharma | E21B 49/006 166/308.1 |
| 2016/0177693 | A1 * | 6/2016 | Gomaa | C09K 8/882 166/305.1 |
| 2017/0130567 | A1 * | 5/2017 | Soliman | E21B 43/26 |
| 2017/0175505 | A1 * | 6/2017 | Curlett | E21B 43/2401 |
| 2017/0247995 | A1 * | 8/2017 | Crews | G01V 1/288 |
| 2018/0238155 | A1 * | 8/2018 | Nguyen | C09K 8/80 |
| 2018/0371886 | A1 * | 12/2018 | Zeghlache | E21B 43/30 |
| 2019/0024489 | A1 * | 1/2019 | Nguyen | E21B 43/267 |
| 2019/0145251 | A1 * | 5/2019 | Johnson | E21B 43/26 166/250.1 |
| 2019/0353575 | A1 * | 11/2019 | Clarkson | G01N 15/0826 |
| 2020/0291774 | A1 * | 9/2020 | Balan | G01V 99/005 |
| 2021/0270116 | A1 * | 9/2021 | Johnson | E21B 47/11 |
| 2022/0082001 | A1 * | 3/2022 | Balan | E21B 33/12 |

OTHER PUBLICATIONS

Assiri et al. (Distributed Pressure Sensing for Production Data Analysis, 2019, SPE, pp. 1-11) (Year: 2019).*
Liu, Guoqing et al.; "Fracture Surface Area Estimation from Hydraulic-Fracture Treatment Pressure Falloff Data" SPE 199895, SPE/AAPG/SEG Unconventional Resources Technology Conference, Denver, CO, Jul. 22-24, 2019; pp. 1-14.
International Search Report and Written Opinion for International Application No. PCT/US2021/056078, report dated Feb. 11, 2022; pp. 1-17.

* cited by examiner

METHODS AND SYSTEMS FOR DETERMINING RESERVOIR AND FRACTURE PROPERTIES

TECHNICAL FIELD

Embodiments generally relate to methods for determining formation properties, and more specifically relate to methods and systems for determining reservoir and fracture properties.

BACKGROUND

Determination of flow properties of extremely low permeability source rocks or tight reservoirs is critical for optimum field development planning. Conventional well testing or rate transient analysis methods applied to hydraulically fractured horizontal wells in such reservoirs are impractical due to the very long testing periods needed to obtain reservoir properties and fracture surface areas along the well trajectory, which prevents evaluation of production performance of individual fractures. In addition, conventional well tests disturb initial reservoir conditions with continuous injection/production rates.

SUMMARY

Example embodiments disclosed address the issues listed above by proposing a new implementation of pulse interference test between two or more hydraulic fractures. The method includes creating at least two fractures in a wellbore and isolating them from each other by using packers, tubings, etc. to prevent their hydraulic communication inside the wellbore. The method further includes recording and monitoring pressures at both fractures by using pressure gauges and transmitting the data though fiber optic cables. The method further includes generating a pressure pulse at the first fracture by either injecting or producing at a specific rate for a predetermined period of time and then shutting it down. The method further includes waiting until the pressure wave is detected at the second fracture, which ensures that the volume in between the fractures is fully investigated. In the next step, recording of pressures at both fractures is stopped. The method further includes repeating this test at different locations along the wellbore to evaluate heterogeneity in permeability and variation of fracture surface area created along the wellbore.

The method also includes analyzing pressure and rate data to determine permeability and fracture surface area by using analytical or numerical simulation models or physics-based proxy models inputting pressure front/peak arrival time or absolute peak pressure value or matching the complete pressure observations by changing permeability and area in the calculations. Pressure front/peak arrival time corresponds to a duration, which starts when a pressure/rate pulse is sent from a fracture and ends when pressure front/peak is detected for the first time in the adjacent fractures. If permeability is determined, then fracture surface area can be determined based on additional attributes of the pressure change. If fracture surface area is determined, then permeability can be determined based on additional attributes of the pressure change. If an injection test is implemented, then determined fracture surface area corresponds to total surface area (propped and unpropped surface area). If a production test is implemented, however, then determined fracture surface area corresponds to effective (propped) surface area.

Another example embodiment is a system for implementation of pulse interference test between two or more hydraulic fractures. The system includes at least two fractures in a wellbore, which are isolated from each other by using packers, tubings, etc. to prevent their hydraulic communication inside the wellbore. The system further includes means for recording and monitoring pressures at both fractures by using pressure gauges and transmitting the data though fiber optic cables. The system further includes means for generating a pressure pulse at the first fracture by either injecting or producing at a specific rate for a predetermined period of time and then shutting it down. The system further includes means for determining the pressure wave is detected at the second fracture, which ensures that the volume in between the fractures is fully investigated. In the next step, recording of pressures at both fractures is stopped. The system further includes repeating this test at different locations along the wellbore to evaluate heterogeneity in permeability and variation of fracture surface area created along the wellbore.

The system also includes means for analyzing pressure and rate data to determine either permeability or fracture surface area by using analytical or numerical simulation models or physics-based proxy models inputting pressure front/peak arrival time or absolute peak pressure value or matching the complete pressure observations by changing permeability and area in the calculations. Pressure front/peak arrival time corresponds to a duration, which starts when a pressure/rate pulse is sent from a fracture and ends when pressure front/peak is detected for the first time in the adjacent fractures. If permeability is determined, then fracture surface area can be determined independently from other systems. If fracture surface area is determined, then permeability can be determined independently by other systems. If an injection test is implemented, then determined fracture surface area corresponds to total surface area (propped and unpropped surface area). If a production test is implemented, however, then determined fracture surface area corresponds to effective (propped) surface area.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure can now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure can be thorough and complete, and can fully convey its scope to those skilled in the art. Like numbers refer to like elements throughout.

Figure 1:
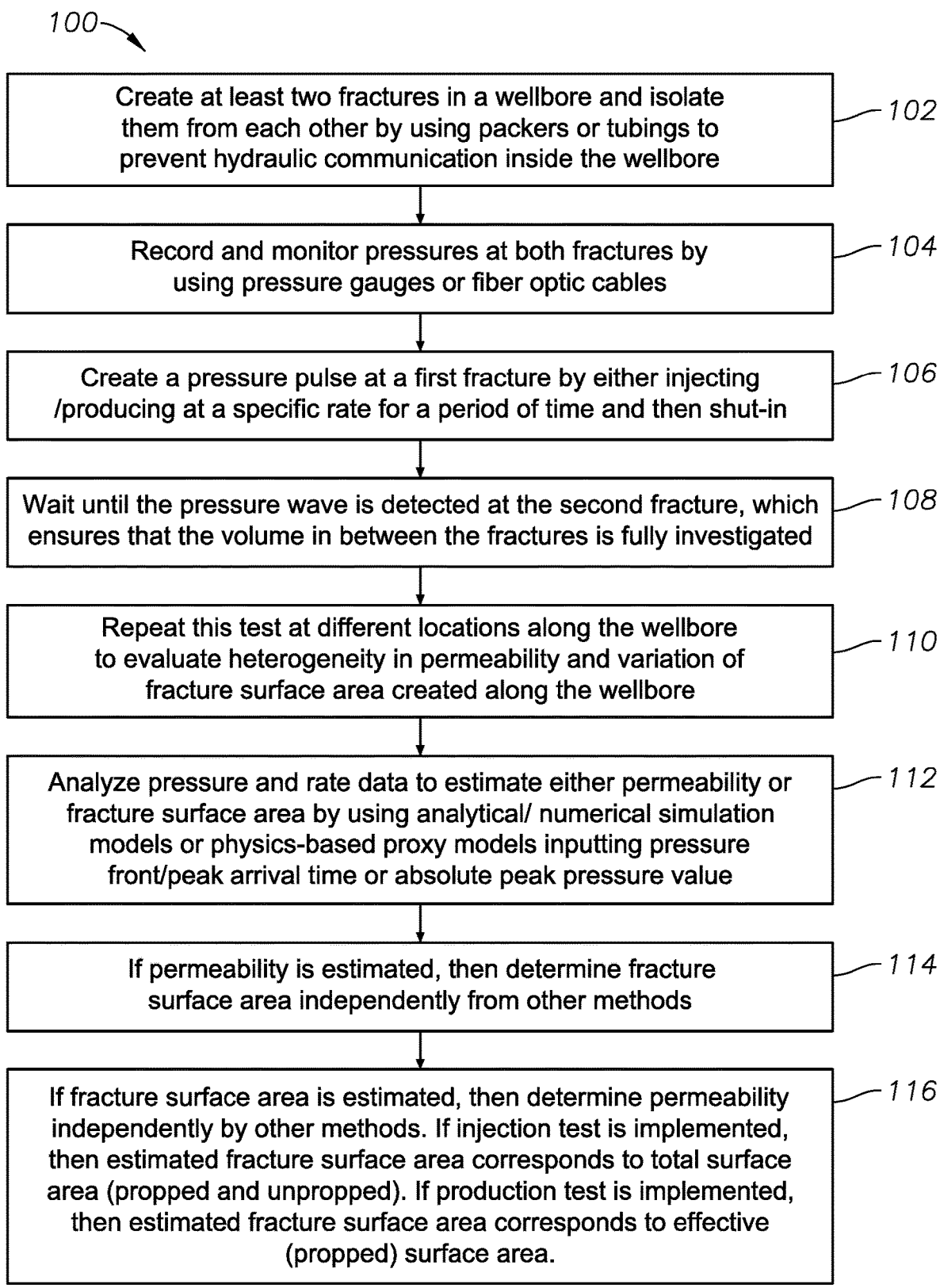
FIG. 1 is a flow chart illustrating example operations in a method for determining permeability of a subsurface formation and a fracture surface area, according to one example embodiment of the disclosure.

Turning now to the figures, FIG. 1 is a flow chart illustrating example operations in a method 100 for determining permeability of a subsurface formation and a fracture surface area, according to one example embodiment of the disclosure. The method includes, at step 102, creating at least two fractures in a wellbore and isolating them from each other by using packers, tubings, etc. to prevent their hydraulic communication inside the wellbore. The method further includes, at step 104, recording and monitoring pressures at both fractures by using pressure gauges and transmitting the data through fiber optic cables. The method further includes, at step 106, generating a pressure pulse at the first fracture by either injecting or producing at a specific rate for a predetermined period of time and then shutting it down. The method further includes, at step 108, determining the elapsed time at which the pressure wave is detected at the second fracture, which ensures that the volume in between the fractures is fully investigated. In the next step, recording of pressures at both fractures is stopped. The method further includes, at step 110, repeating this test at different locations along the wellbore to evaluate heterogeneity in permeability and variation of fracture surface area created along the wellbore.

The method also includes, at step 112, analyzing pressure and rate data to determine either permeability or fracture surface area by using analytical or numerical simulation models or physics-based proxy models inputting pressure front/peak arrival time or absolute peak pressure value or matching the complete pressure observations by changing permeability and area in the calculations. Pressure front/peak arrival time corresponds to a duration, which starts when a pressure/rate pulse is sent from a fracture and ends when pressure front/peak is detected for the first time in the adjacent fractures. At step 114, if permeability is determined, then fracture surface area can be determined independently from other attributes of pressure change. At step 116, if fracture surface area is determined, then permeability can be determined independently by other methods. If an injection test is implemented, then determined fracture surface area corresponds to total surface area (propped and unpropped surface area). If a production test is implemented, however, then determined fracture surface area corresponds to effective (propped) surface area.

Figure 2A:
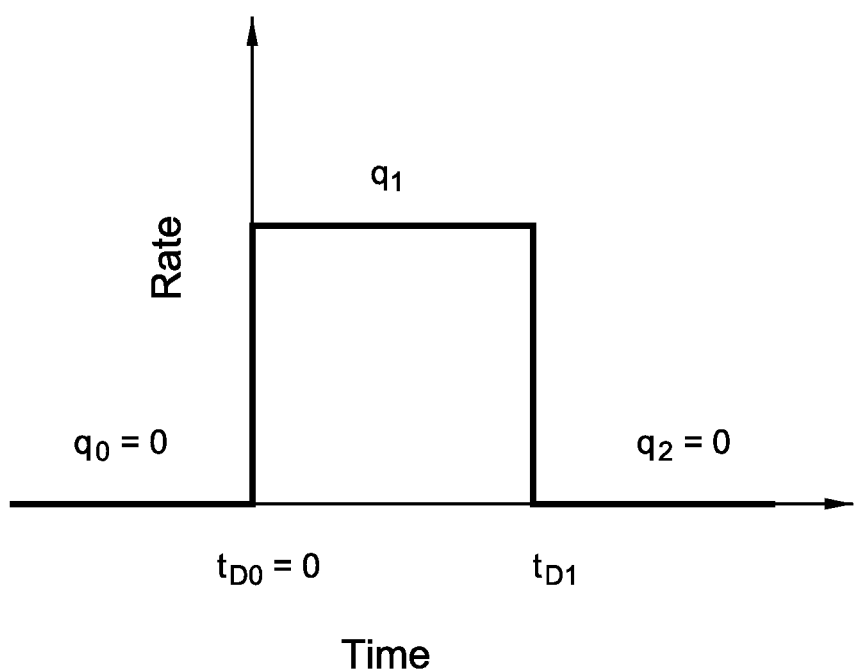
FIGS. 2A-2B illustrate an example step in a method for determining permeability of a subsurface formation and a fracture surface area, according to one example embodiment of the disclosure.
Figure 2B:
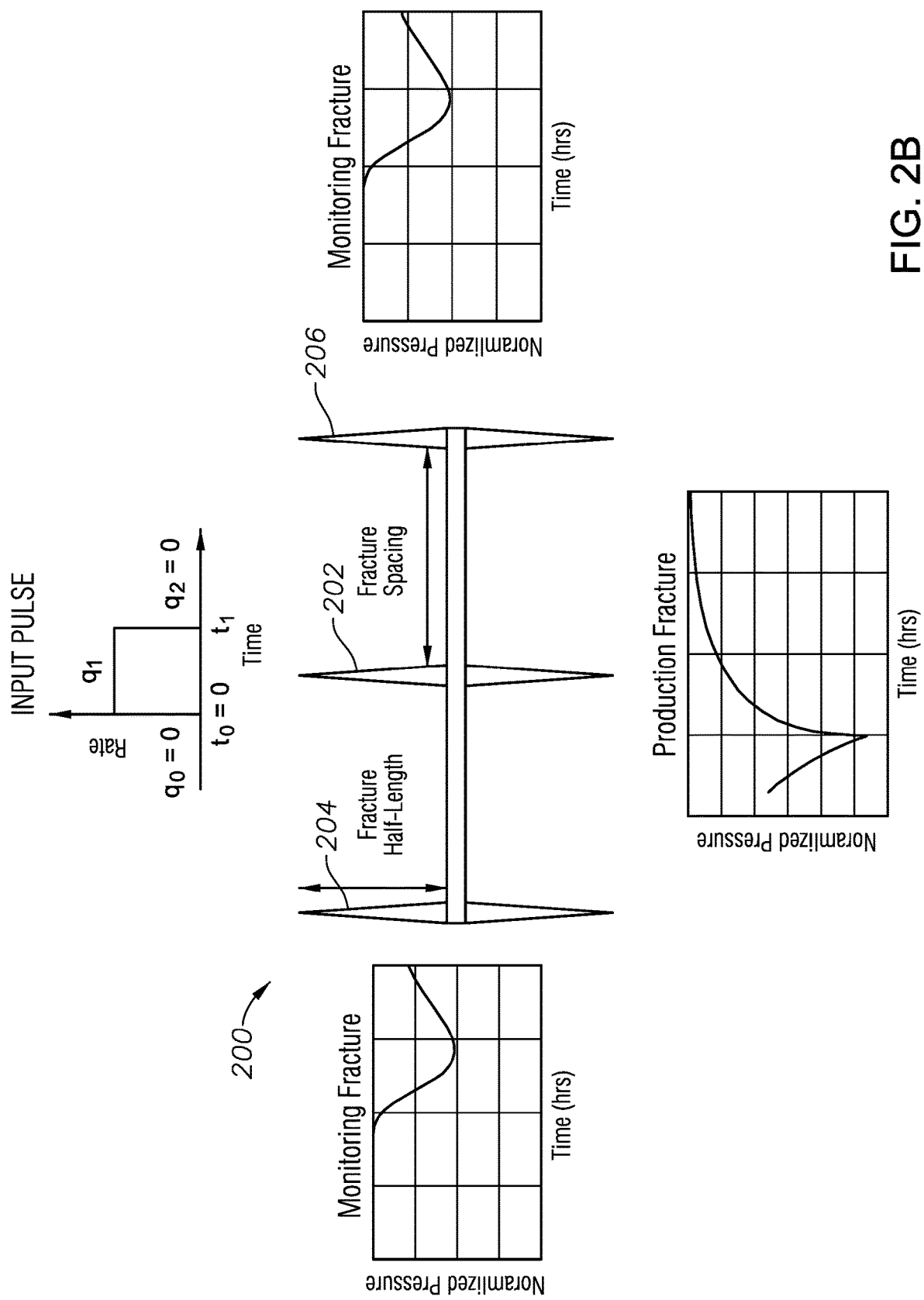

FIGS. 2A-2B illustrate an example system 200 for determining permeability of a subsurface formation and fracture surface area, according to one example embodiment of the disclosure. The system 200 includes a first hydraulic fracture 202 and a second hydraulic fracture 204 in a horizontal well. The system further includes a first pump (not shown) configured to generate a pressure pulse by injecting or producing for a predetermined period of time and then shut-in at the first hydraulic fracture. The system further includes a first pressure gauge configured to monitor pressure at the first hydraulic fracture 202, a second pressure gauge configured to monitor the pressure at the second hydraulic fracture 204, and a processor configured to generate a curve by plotting pressure measured at the second hydraulic fracture versus time, analyze recorded pressure, and rate data to determine either permeability of a subsurface formation and fracture surface area of the first fracture by using analytical or numerical simulation models or physics-based proxy models by inputting pressure front/peak arrival time or absolute peak pressure value. The system may also include a third hydraulic 206 in the horizontal well, and a third pressure gauge configured to monitor the pressure at the third hydraulic fracture.

Figure 3:
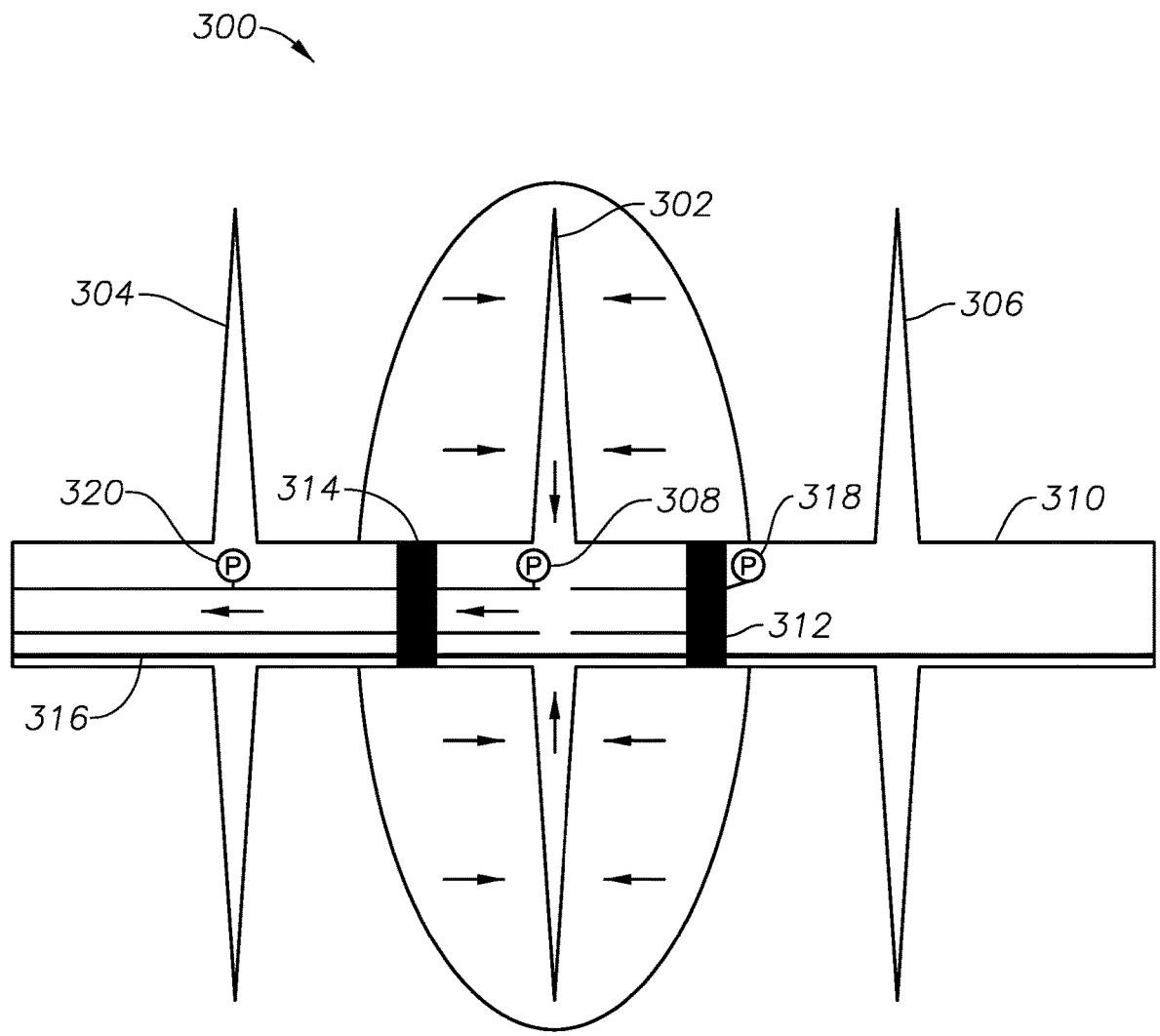
FIG. 3 illustrates a horizontal wellbore with three hydraulic fractures; the middle one is used for sending a pressure wave to adjacent fractures by injecting/producing for a certain period of time and then shut-in; the middle fracture is isolated from others with two packers, according to one example embodiment of the disclosure.

FIG. 3 illustrates a system 300 for determining permeability or transmissibility of a subsurface formation and fracture surface area, according to one example embodiment of the disclosure. The system 300 includes a horizontal wellbore 310 with three hydraulic fractures 302, 304, 306. Fracture 302 is used for sending pressure pulse to adjacent fractures 304, 306 by injecting or producing for a predetermined period of time. The middle fracture 302 is isolated from others using one or more packers 312, 314, according to one example embodiment of the disclosure. The system 300 includes pressure gauges 320, 308, 318 installed at each of the fractures 304, 302, 306, and fiber optics 316 including a distributed acoustic sensor (DAS) or a distributed temperature sensor (DTS) installed along each of the hydraulic fractures 304, 302, 306. The pressure gauges 318 are used to continuously measure and monitor the pressure pulse at each of the hydraulic fractures, as a function of time.

The Distributed Acoustic Sensor (DAS) measures the true acoustic field every 1 meter over up to 50 kilometers of sensing fiber by sending an optical signal into the fiber and looking at the naturally occurring reflections that are scattered back all along the glass. By analyzing these reflections, and measuring the time between the laser pulse being launched and the signal being received, the DAS can measure the acoustic signal at all points along the fiber.

The Distributed Temperature Sensor (DTS) illuminates the sensing fiber with a series of sub-nanosecond duration pulses. As the pulses propagate down the fiber, a small amount of light is backscattered towards the laser source. The majority of the backscatter, Rayleigh light, is at the same optical wavelength, as the laser and is not temperature sensitive. However, a small proportion of the light is scattered by the Raman process and is temperature dependent. By recording the backscattered Raman light as a function of time, the temperature at all points along the fiber can be determined.

Figure 4:
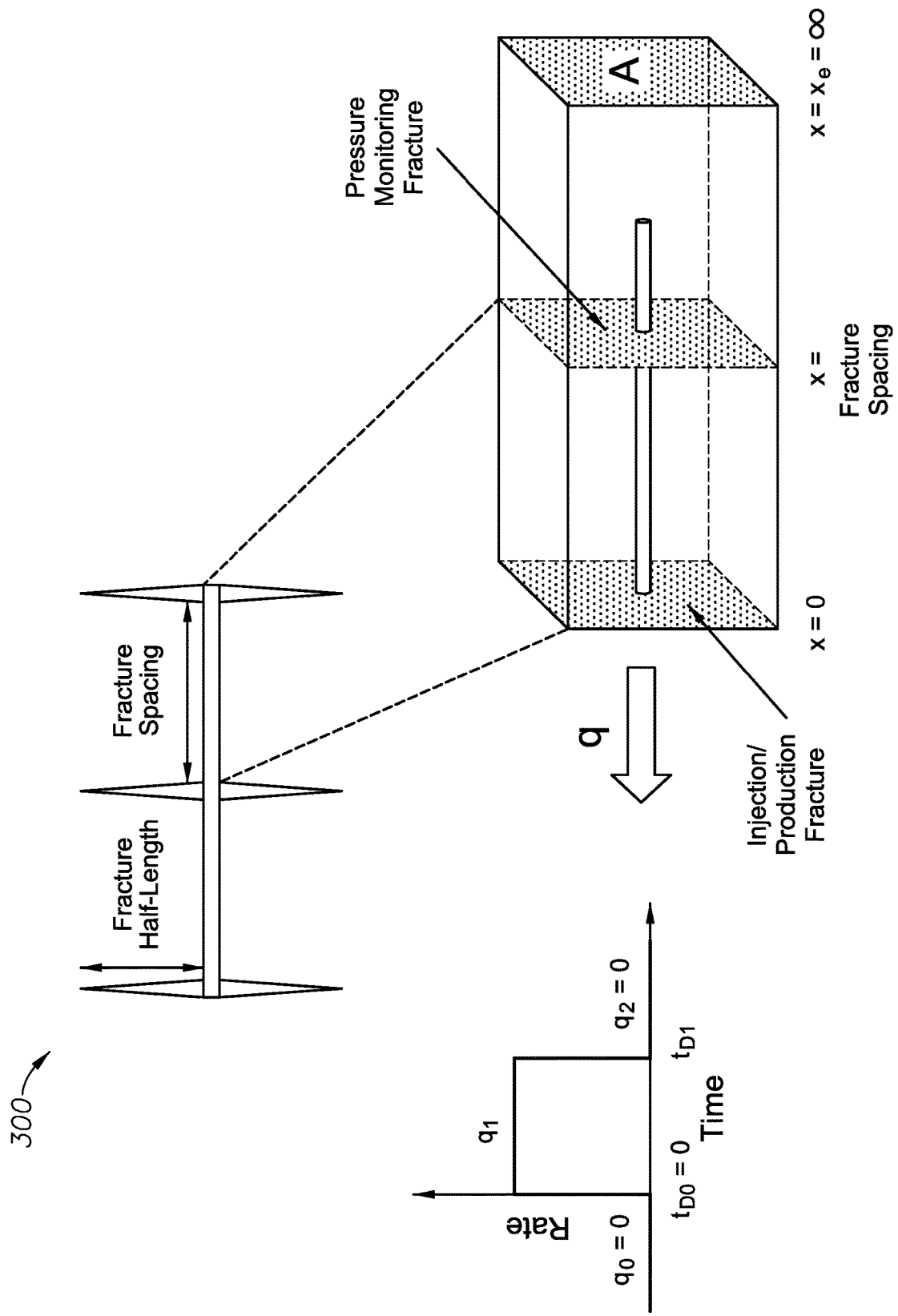
FIG. 4 is a schematic showing conceptual model for transient linear flow between two fractures having surface area, according to some example embodiments of the disclosure.

FIG. 4 is a further detailed view of the system 300 for transient linear flow between two fractures 302, 306 where injection or production fracture in the middle has a surface area of A. Adjacent monitoring fractures may have different surface areas than A. The analytical model provided below represents half of the conceptual model with homogeneous reservoir assumption, according to some example embodiments of the disclosure. In other words, when a rate pulse is sent from the middle fracture, total rate is equally shared by each face of the fractures. Therefore, left boundary condition is constant rate, q, and right boundary condition is infinite reservoir boundary. In the heterogeneous case, however, total rate is unequally shared by each face of the fractures depending on heterogeneity in permeability, which is discussed further in FIG. 5.

The constant rate analytical solution of transient linear flow equation for slightly compressible fluid for $t_D < t_{D_1}$ at any $x_D$ is provided in dimensionless form as:

$$P_D(x_D, t_D) = 2\sqrt{\frac{t_D}{\pi}} \exp\left[\frac{-x_D^2}{4t_D}\right] - x_D \text{erfc}\left[\frac{x_D}{2\sqrt{t_D}}\right]$$

$$t_D = 2.637 \times 10^{-4} \frac{kt}{\phi\mu c_t x_e^2}$$

$$x_D = \frac{x}{x_e}$$

$$P_D = 1.127 \times 10^{-3} \frac{kA}{qB\mu x_e}(P_i - P)$$

Due to symmetry of flow in homogeneous reservoirs ($q_L = q_R = q$), total pulse flow rate is given as follows:

$$q_T = q_L + q_R = 2q$$

At the injection/production fracture, $x_D = 0$ $$P_D(0, t_D) = 2\sqrt{\frac{t_D}{\pi}}$$

The equations above needs to be transformed to consider the shut-in period when ($t_D > t_{D_1}$) based on superposition principle in time:

$$P = P_i - (P_i - P)_{q_1-q_0} - (P_i - P)_{q_2-q_1}$$

$$(P_i - P)_{q_1-q_0} = \frac{(q_1 - q_0)B\mu x_e}{1127 \times 10^{-3} kA}$$
$$\left(2\sqrt{\frac{(t_D - t_{D0})}{\pi}} \exp\left[\frac{-x_D^2}{4(t_D - t_{D0})}\right] - x_D \text{erfc}\left[\frac{x_D}{2\sqrt{(t_D - t_{D0})}}\right]\right)$$

$$(P_i - P)_{q_2-q_1} = \frac{(q_2 - q_1)B\mu x_e}{1127 \times 10^{-3} kA}$$
$$\left(2\sqrt{\frac{(t_D - t_{D1})}{\pi}} \exp\left[\frac{-x_D^2}{4(t_D - t_{D1})}\right] - x_D \text{erfc}\left[\frac{x_D}{2\sqrt{(t_D - t_{D1})}}\right]\right)$$

Pressure solution at any $x_D$ for $t_D > t_{D_1}$ and $t_{D0} = 0$ $$P = P_i - \frac{qB\mu x_e}{1.127 \times 10^{-3} kA}\left(2\sqrt{\frac{t_D}{\pi}} \exp\left[\frac{-x_D^2}{4t_D}\right] - x_D \text{erfc}\left[\frac{x_D}{2\sqrt{t_D}}\right] - 2\sqrt{\frac{(t_D - t_{D1})}{\pi}} \exp\left[\frac{-x_D^2}{4(t_D - t_{D1})}\right] + x_D \text{erfc}\left[\frac{x_D}{2\sqrt{(t_D - t_{D1})}}\right]\right)$$

At the injection/production fracture $x_D = 0$ and $P = P_{bh1}$ for $t_D > t_{D_1}$ $$P_{bh1} = P_i - \frac{2qB\mu x_e}{1.127 \times 10^{-3}\sqrt{\pi} kA}\left(\sqrt{t_D} - \sqrt{(t_D - t_{D1})}\right)$$

$$\frac{(P_i - P_{bh1})}{q} = \left(16.26 \frac{B}{A}\sqrt{\frac{\mu}{\phi k c_t}}\right)\left(\sqrt{t} - \sqrt{(t - t_1)}\right)$$

Plot $\frac{(P_i - P_{bh1})}{q}$ vs. $\left(\sqrt{t} - \sqrt{(t - t_1)}\right)$ $$\text{Slope} = 16.26 \frac{B}{A}\sqrt{\frac{\mu}{\phi k c_t}}$$

The slope of the plot of $$\frac{(P_i - P_{bh1})}{q} \text{ vs. } \left(\sqrt{t} - \sqrt{(t - t_1)}\right)$$

can be used to determine the product of square root of reservoir permeability and fracture surface area of the first fracture.

A log-log plot may be generated using:

$$\text{Log}\left[\frac{(P_i - P_{bh1})}{q}\right] = \text{Log}\left(16.26 \frac{B}{A}\sqrt{\frac{\mu}{\phi k c_t}}\right) + 0.5 * \text{Log}(t)$$

Figure 5:
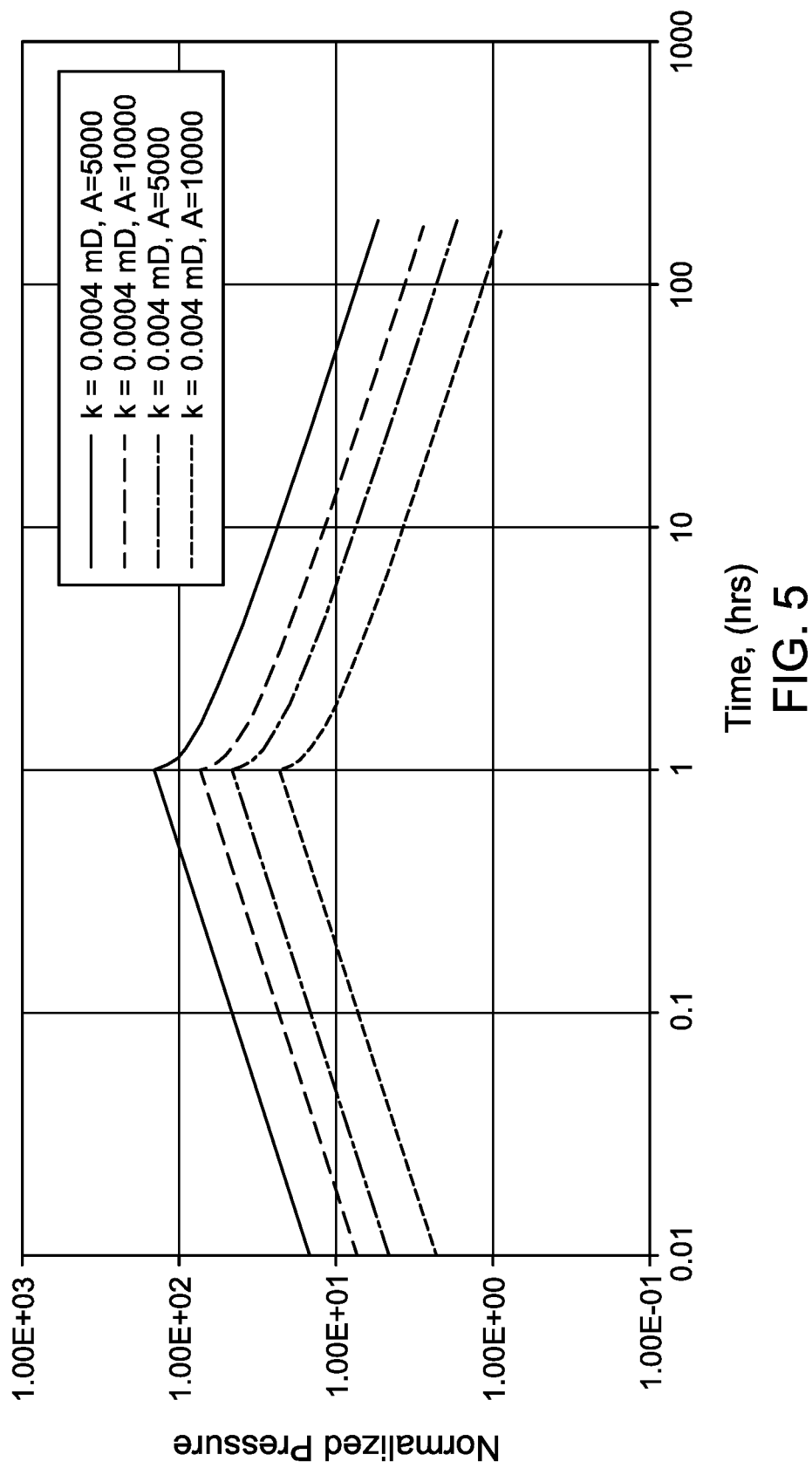
FIG. 5 shows an example plot illustrating that regardless of permeability of fracture area, the normalized pressure changes as a function of time plots as a line of slope=0.5 for the injection or production period. The intercept of the line allows clear delineation of the product of square root of reservoir permeability and fracture surface area of the first fracture.

An example plot is shown in FIG. 5 for the purpose of illustration. It can be observed from this plot that regardless of permeability or fracture area, the normalized pressure change as a function of time plots as a line of slope=0.5 for the injection or production period. The intercept of the line (I) allows clear delineation of the product of square root of reservoir permeability and fracture surface area of the first fracture.

$$A\sqrt{k} = \left(16.26B\sqrt{\frac{\mu}{\phi c_t}}\right) * 10^{-I}$$

This observation can be combined with pressure monitoring data from a neighboring fracture.

Figure 6A:
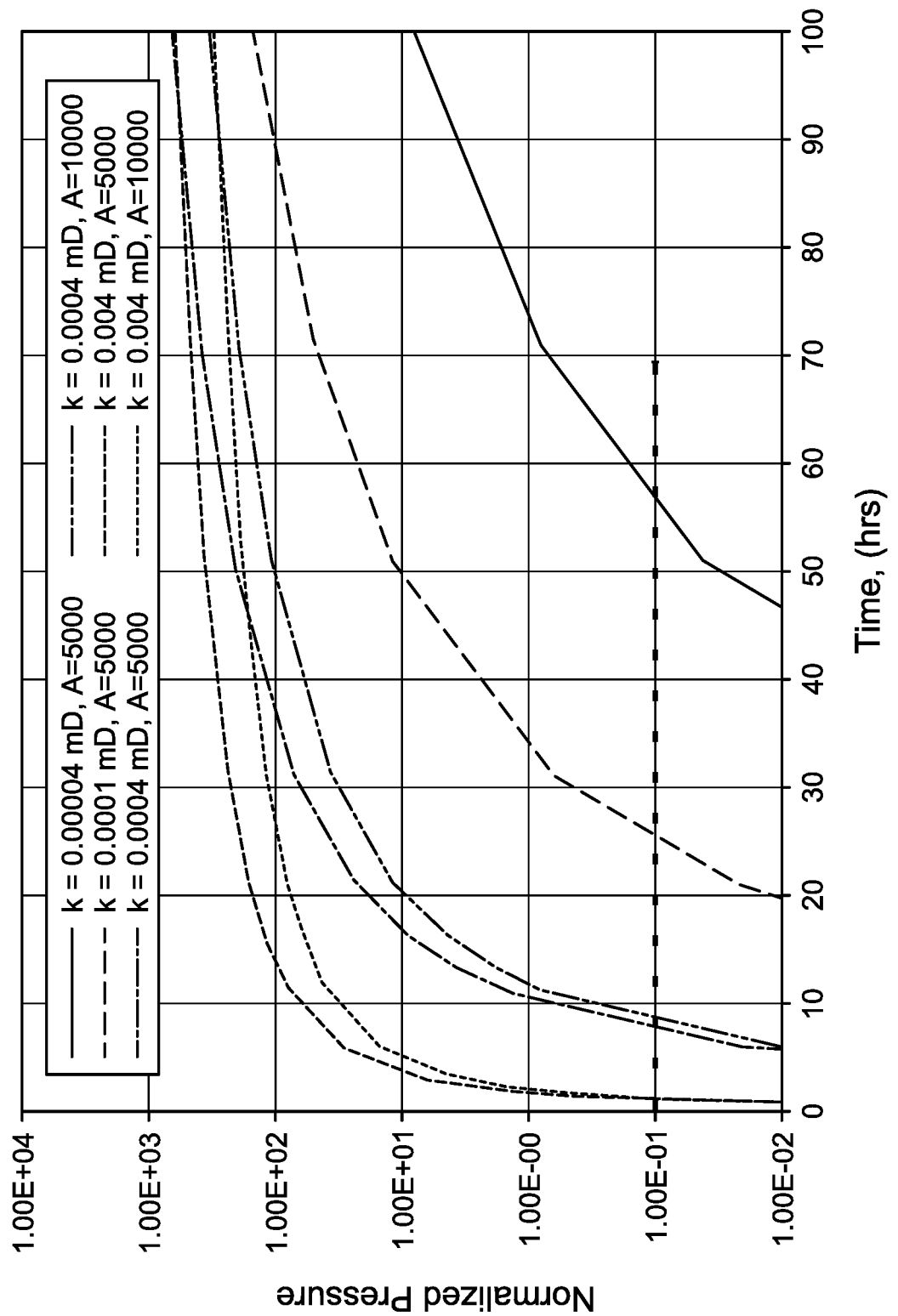
FIG. 6A shows an example plot for monitoring a fracture where regardless of the fracture surface area, the time at which the pressure signal arrives at the monitoring well is the same for a given permeability. However, this time changes significantly with permeability. The arrival time for normalized pressure signal of 0.1 is plotted against permeability in FIG. 6B and shows a very strong functional dependence. Therefore, the permeability value can be determined with good confidence from the arrival time of the selected normalized pressure signal. The permeability value from this step, when combined with the observation in FIG. 5 can be used to determine the fracture surface area.
Figure 6B:
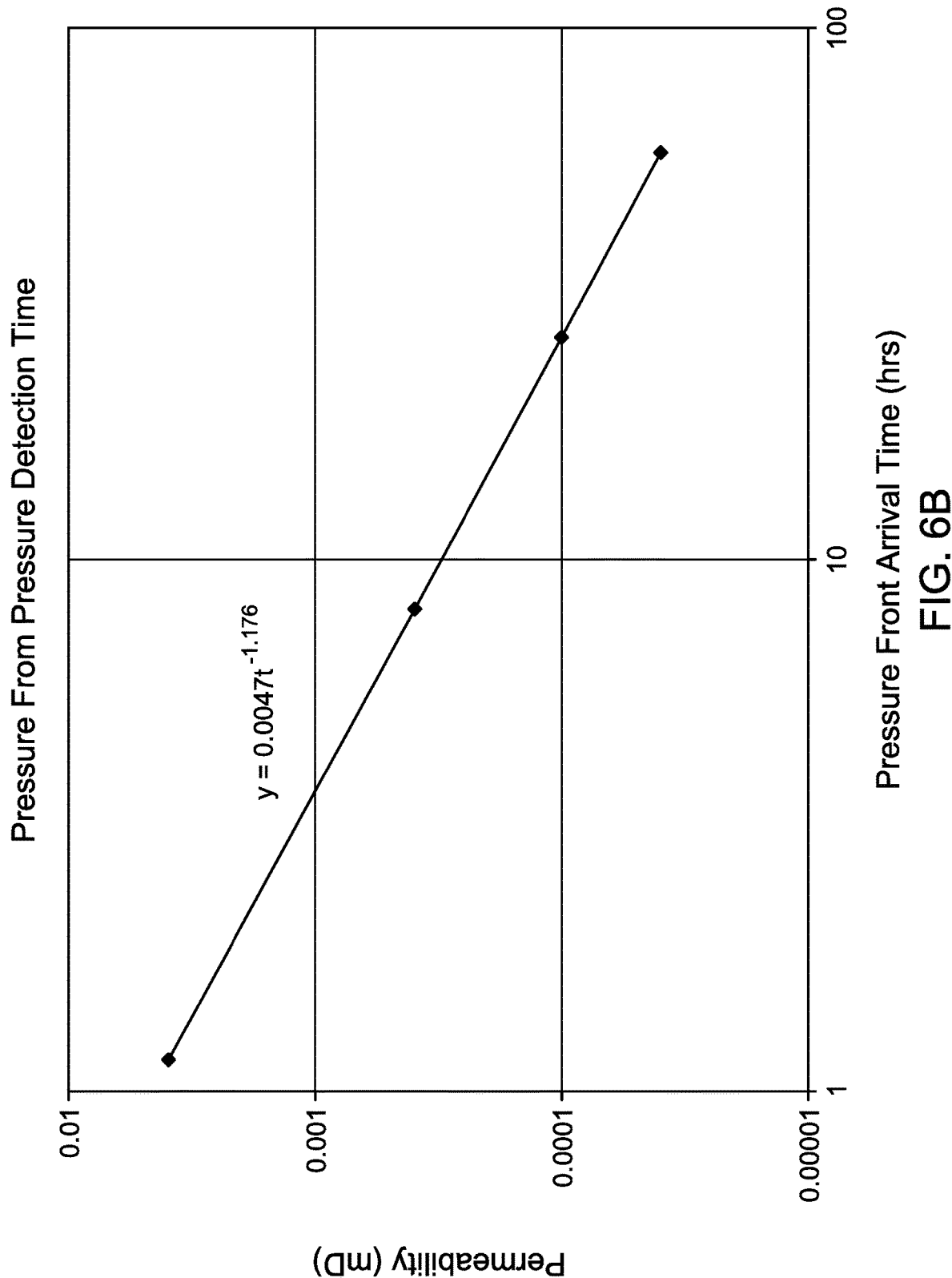

An example plot for a monitoring fracture is shown in FIG. 6A for the purpose of illustration. It may be observed from this plot that regardless of the fracture surface area, the time at which a selected value of the normalized pressure signal arrives at the monitoring fracture location is dependent on the permeability. In FIG. 6A, the selected value for normalized pressure is 0.1, but the method works with any selected value, depending on the detection limit of the pressure gauge. The arrival time changes significantly with permeability. The arrival time for normalized pressure signal of 0.1 is plotted against permeability in FIG. 6B and shows a very strong functional dependence. Therefore, the permeability value can be determined with good confidence from the arrival time of the selected normalized pressure signal. The permeability value from this step, when combined with the observation in FIG. 5 can be used to determine the fracture surface area as shown by the equation below.

$$A = \left(16.26B\sqrt{\frac{\mu}{\phi c_t}} / \sqrt{k}\right) * 10^{-I}$$

If an injection test is implemented, then determined fracture surface area corresponds to total surface area (propped and unpropped). If a production test is implemented, however, then determined fracture surface area corresponds to effective (propped) surface area. It should be noted, however, that the analytical method presented here requires bottom-hole pressure data at the injection or production fracture. Pressure monitoring data obtained from neighboring fractures can also be used to determine permeability or fracture surface area by using analytical/numerical simulation models, physics-based proxy models inputs pressure front/peak arrival time or absolute peak pressure value. In fact, such proxy models require shorter well test durations (less data) to determine permeability or fracture surface area, which will be discussed later.

Similar formulation can also be derived for gas reservoirs. However, the pressure term, P, should be replace by pseudo pressure term, m(P)

$$m(P) = 2\int_0^P P\frac{dP}{\mu_g z}$$

Figure 7:
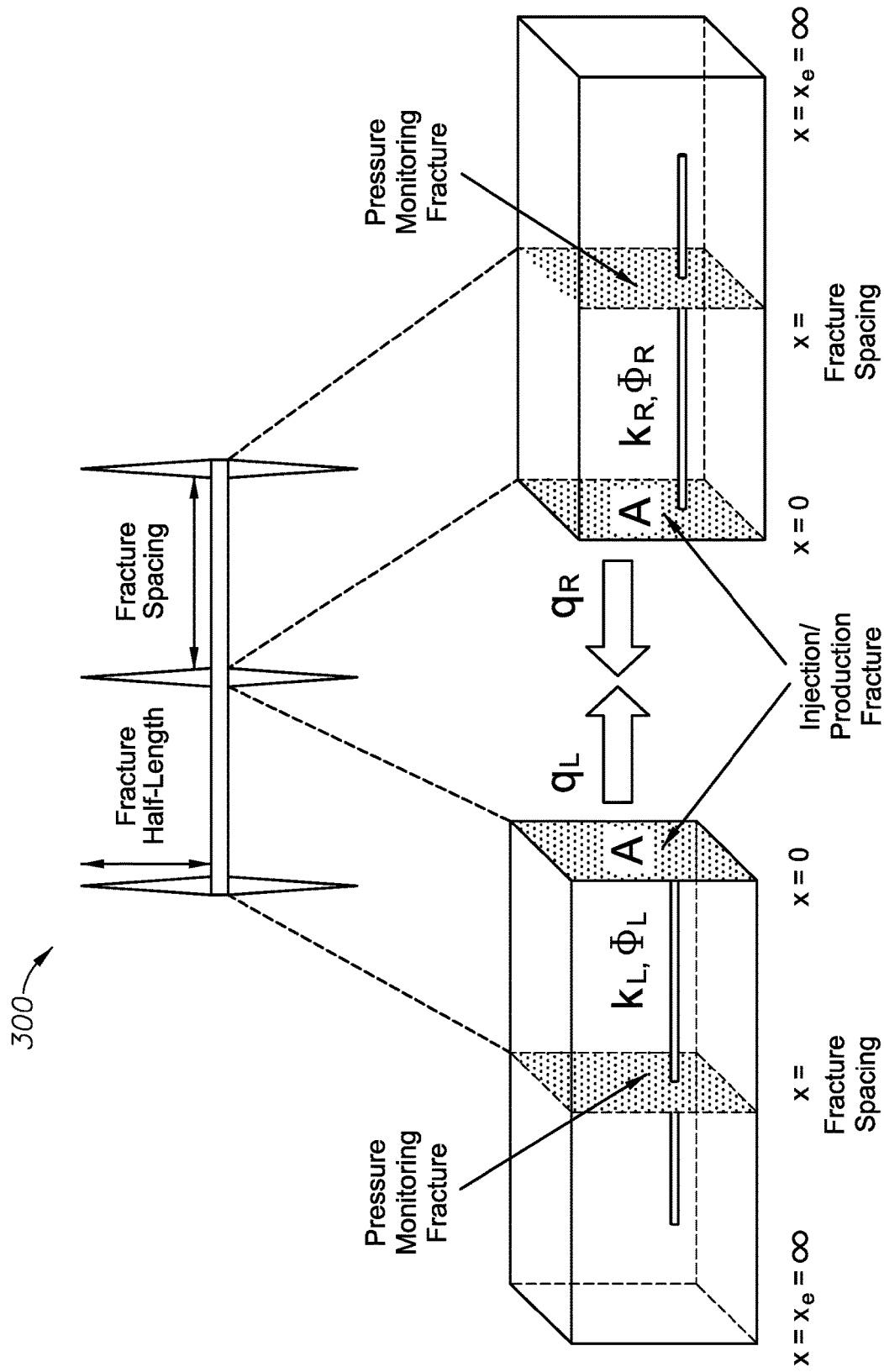
FIG. 7 illustrates a conceptual model for heterogeneous system for determining permeability of a subsurface formation and a fracture surface area, according to one example embodiment of the disclosure.

The constant rate solution of transient linear flow equation provided above assumes that reservoir is homogeneous. It means that when a pressure pulse is sent from middle fracture and it is equally shared by each face of the fracture ($q_L = q_R = q$). In the presence of heterogeneity, however, $q_L \neq q_R$ as shown in FIG. 7. Therefore, two equations: one for right face of injection/production fracture and the other one is for left face, need to be defined. The right and left regions may have different porosity and permeability. Due to heterogeneity ($q_L \neq q_R$), total pulse flow rate is given as follows:

$$q_T = q_L + q_R = 2q$$

Since it is the same injection/production point, $P_{bh1}$ is the same for right and left side equations as provided below:

$$P_{bh1} = P_i - q_L\left(16.25\frac{B}{A}\sqrt{\frac{\mu}{\phi_L k_L c_t}}\right)\left(\sqrt{t} - \sqrt{(t-t_1)}\right)$$

$$P_{bh1} = P_i - q_R\left(16.25\frac{B}{A}\sqrt{\frac{\mu}{\phi_R k_R c_t}}\right)\left(\sqrt{t} - \sqrt{(t-t_1)}\right)$$

After solving them together:

$$q_L = q_R\sqrt{\left(\frac{k_L}{k_R}\right)\left(\frac{\phi_L}{\phi_R}\right)}$$

Based on this formulation, it is expected that different pressure responses can be monitored at neighbor fractures. These differences can be used to quantify heterogeneity. In fact, if the proposed test method here is repeated at different locations along the wellbore, then heterogeneity in permeability and variation of fracture surface area along the wellbore can be evaluated.

k=permeability (mD)
$k_L$=left side permeability (mD)
$k_R$=right side permeability (mD)
A=fracture surface area (ft²)
q=injection/production rate at one face of fracture(stb/day)
$q_L$=injection/production rate at left face of fracture(stb/day)
$q_R$=injection/production rate at right face of fracture(stb/day)
B=oil formation volume factor (rbbl/stb)
$x_e$=distance to external boundary (ft)
$x_D$=dimensionless distance
x=distance from injection or production fracture (ft)
$P_i$=initial reservoir pressure (psi)
P=pressure (psi)
$P_{bh1}$=bottom-hole pressure at the injection/production fracture (psi)
$P_D$=dimensionless pressure
t=time (hrs)
$t_D$=dimensionless time
z=compressibility factor
Ø=porosity
$Ø_L$=left side porosity
$Ø_R$=right side porosity
μ=viscosity (cp)
$μ_g$=gas viscosity (cp)

Examples

Example inputs for the analytical model are provided in Table 1. The objective of this example is to show that physics-based proxy models can determine permeability or fracture surface area using monitoring fracture pressure data. It should be noted, however, that while the analytical method discussed before uses bottom-hole pressures at the injection/production fracture, physics-based proxy model analysis introduced here uses bottom-hole pressures at the monitoring fracture.

Table 1. In this example, the middle fracture is produced at a rate of 100 bbl/day for an hour and then shut in. Therefore, boundary rate condition is 50 bbl/day for a homogeneous reservoir, which is half of total injection rate. The objective of this example is to show that physics-based proxy models can determine permeability or fracture surface area using monitoring fracture pressure data. It should be noted, however, that while the analytical method discussed before uses bottom-hole pressures at the injection/production fracture, physics-based proxy model analysis introduced here uses bottom-hole pressures at the monitoring fracture.

TABLE 1

Sample inputs for testing using an analytical model derived in previous section:

| | |
|---|---|
| Fracture Spacing (ft) | 5 |
| φ | 0.08 |
| μ (cp) | 0.6 |
| ct (1/psi) | 1.60E−05 |
| k (md) | 5.00E−04 |
| A (ft$^2$) | 10000 |
| q (stb/d) | 50 |
| B (res. bbl/stb) | 1.3 |
| Pi (psi) | 6000 |

Figure 8A:
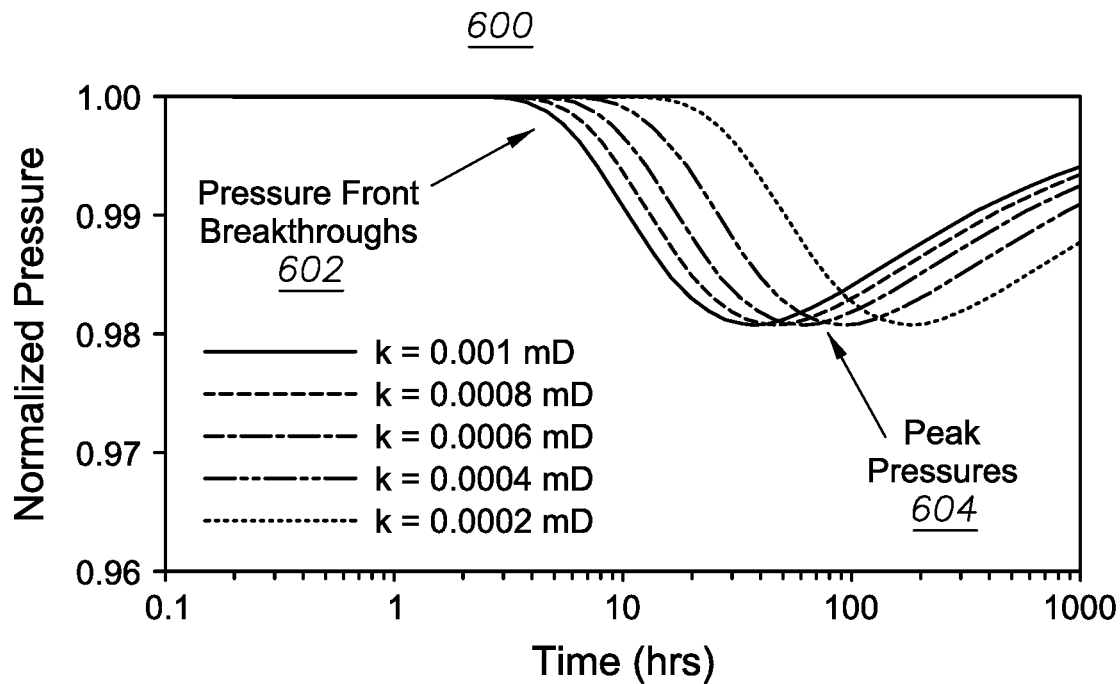
FIG. 8A shows normalized pressure vs time response at a monitoring fracture for different permeabilities.
Figure 8B:
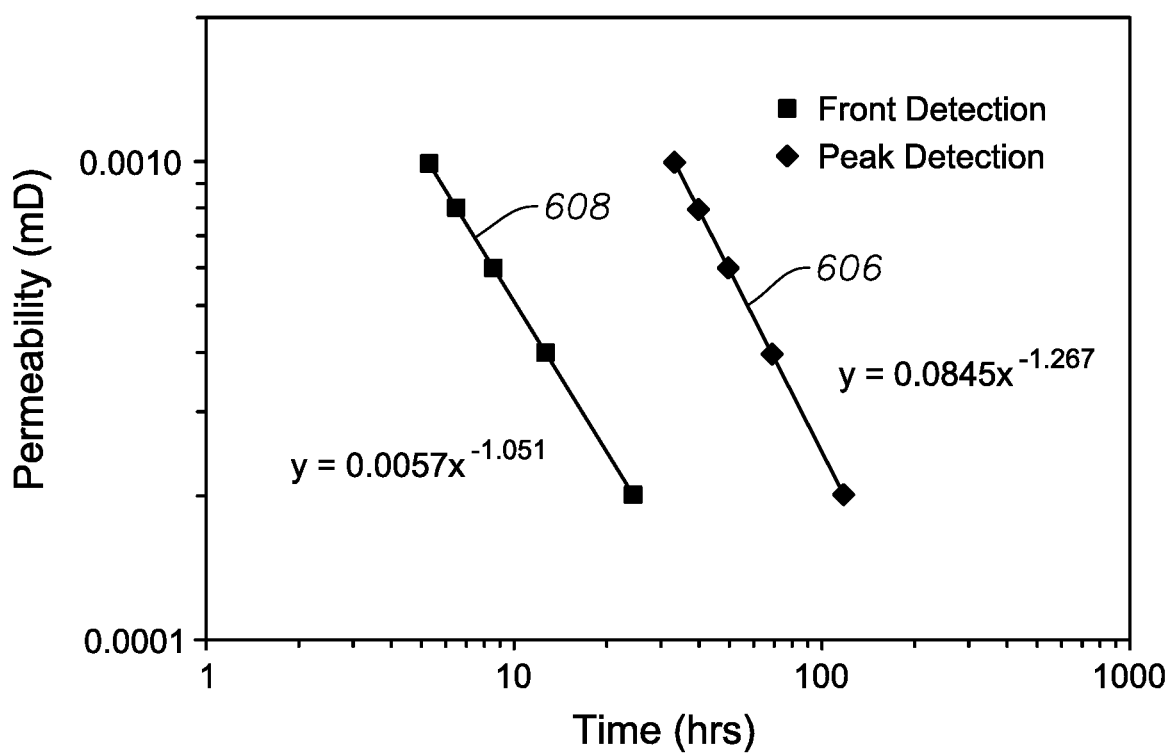
FIG. 8B shows pressure front/peak arrival time is directly related to reservoir transmissibility and therefore permeability, according to one example embodiment of the disclosure.

FIG. 8A shows normalized pressure versus time curves 600 at a monitoring fracture for different permeability values. These curves are generated based on the analytical solution presented in the previous section. FIG. 8B shows that pressure front/peak arrival time is directly related to reservoir permeability, according to one example embodiment of the disclosure. Pressure is normalized with respect to initial reservoir pressure. The normalized pressure, as illustrated in FIG. 8A goes from pressure front breakthroughs 602 to peak pressures 604 where pressure front/peak appear on the plot are also indicated. Based on analytical solution for different permeability values ranging from 100 nD to 1 μD, a correlation between permeability 608 and pressure front/peak 606 is provided in FIG. 8B. This proxy model or a similar model can be used to determine permeability based on pressure front/peak arrival time. It is important to note that an order of magnitude shorter field test is needed when pressure front arrival time 608 is used in proxy model rather than the peak arrival time 606.

Figure 9A:
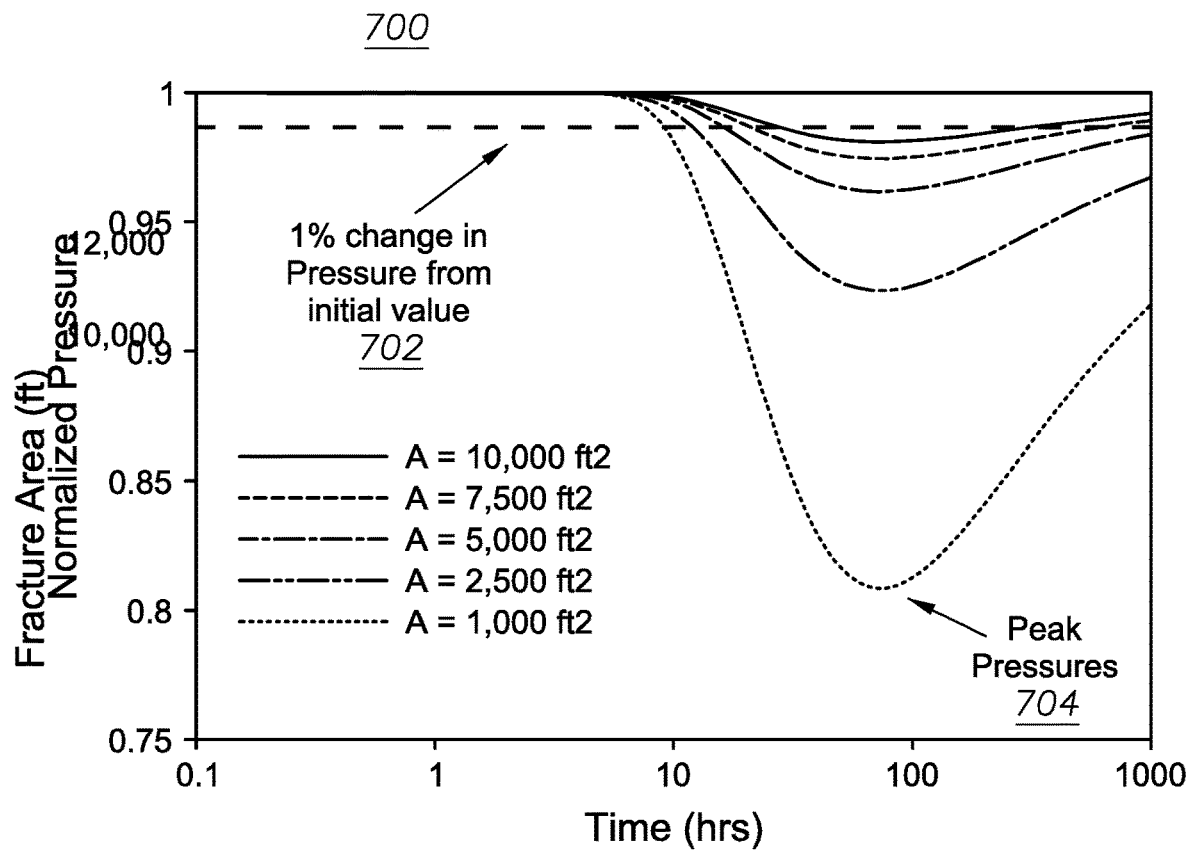
FIG. 9A shows normalized pressure versus time response curves at a monitoring fracture for different fracture surface areas of the first fracture.
Figure 9B:
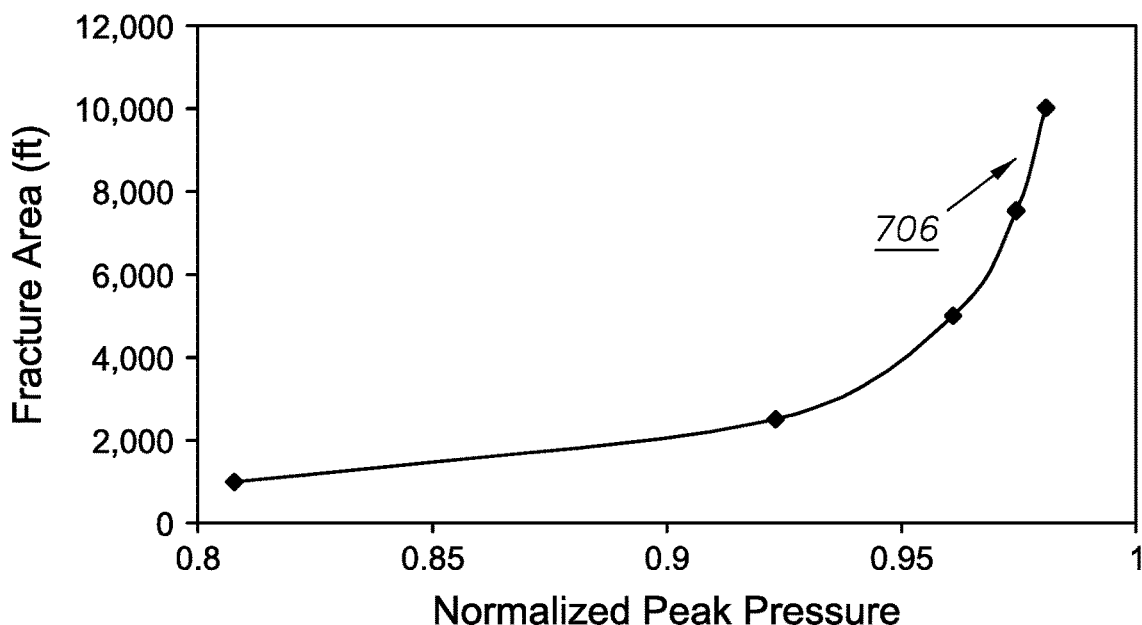
FIG. 9B shows normalized peak pressure is directly related to fracture surface area of the first fracture.
Figure 9C:
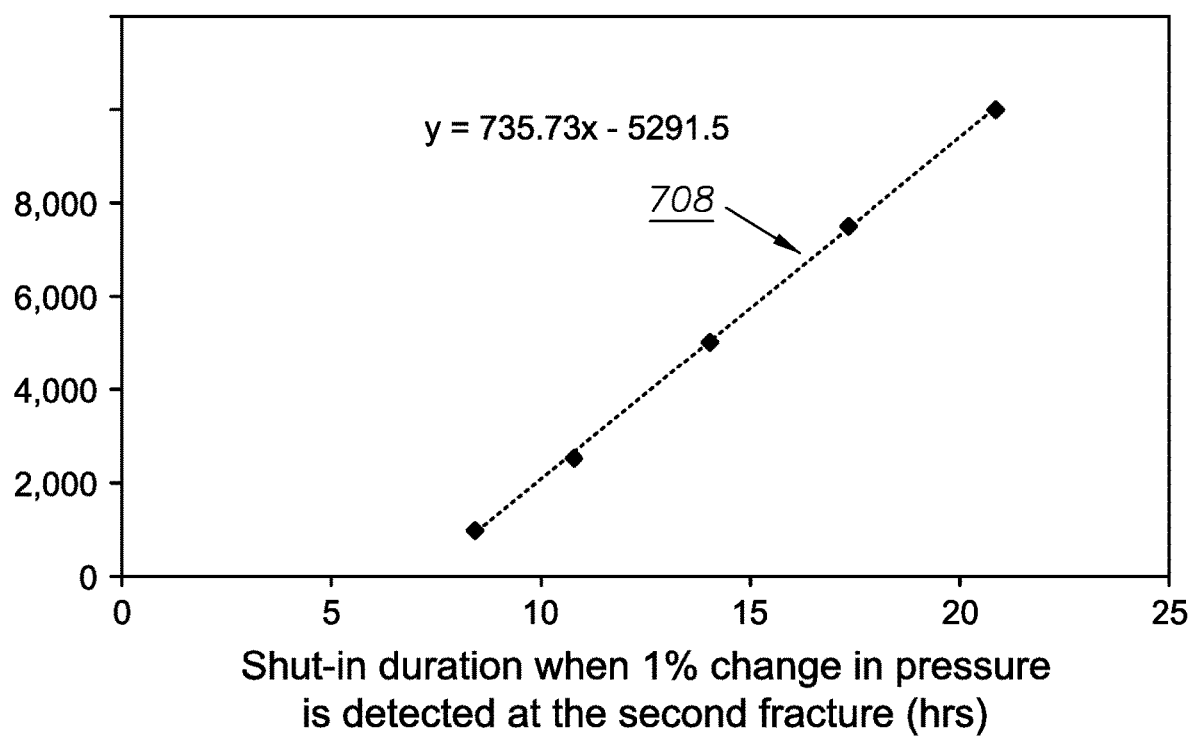
FIG. 9C shows shut-in duration at which 1% change in pressure is detected at the second fracture is directly related to fracture surface area of the first fracture, according to one example embodiment of the disclosure.

FIG. 9A shows normalized pressure versus time curves 700 at a monitoring fracture for different fracture surface areas. These curves are generated based on the analytical solution presented in the previous section. The dashed line parallel to X axis in FIG. 9A shows 1% change in pressure from its initial value. Pressure is normalized with respect to initial reservoir pressure. Therefore, initial reservoir pressure corresponds a value of 1.0. The normalized pressure, as illustrated in FIG. 9A goes from pressure front breakthroughs 702 to peak pressures 704 where pressure front/peak appear on the plot are also indicated. In theory, while pressure front breakthrough should be independent of fracture surface area, value of peak pressure should be a function of fracture surface area. Based on analytical solutions for different values of fracture surface area in FIG. 9A, FIG. 9B shows that fracture area is a function of normalized peak pressure, according to one example embodiment of the disclosure. This proxy model or a similar model can be used to determine fracture surface area based on normalized peak pressure. It is important to note that peak pressures can be detected after 80 hrs of shut-in. Whereas, as an example, if one may detect 1% change in pressure from its initial value at a monitoring fracture, then, as shown in FIG. 7C, fracture area can be determined in less than 21 hrs. Therefore, shorter field test is needed if a correlation as shown in FIG. 7C is used.

Computer Readable Medium

Figure 10:
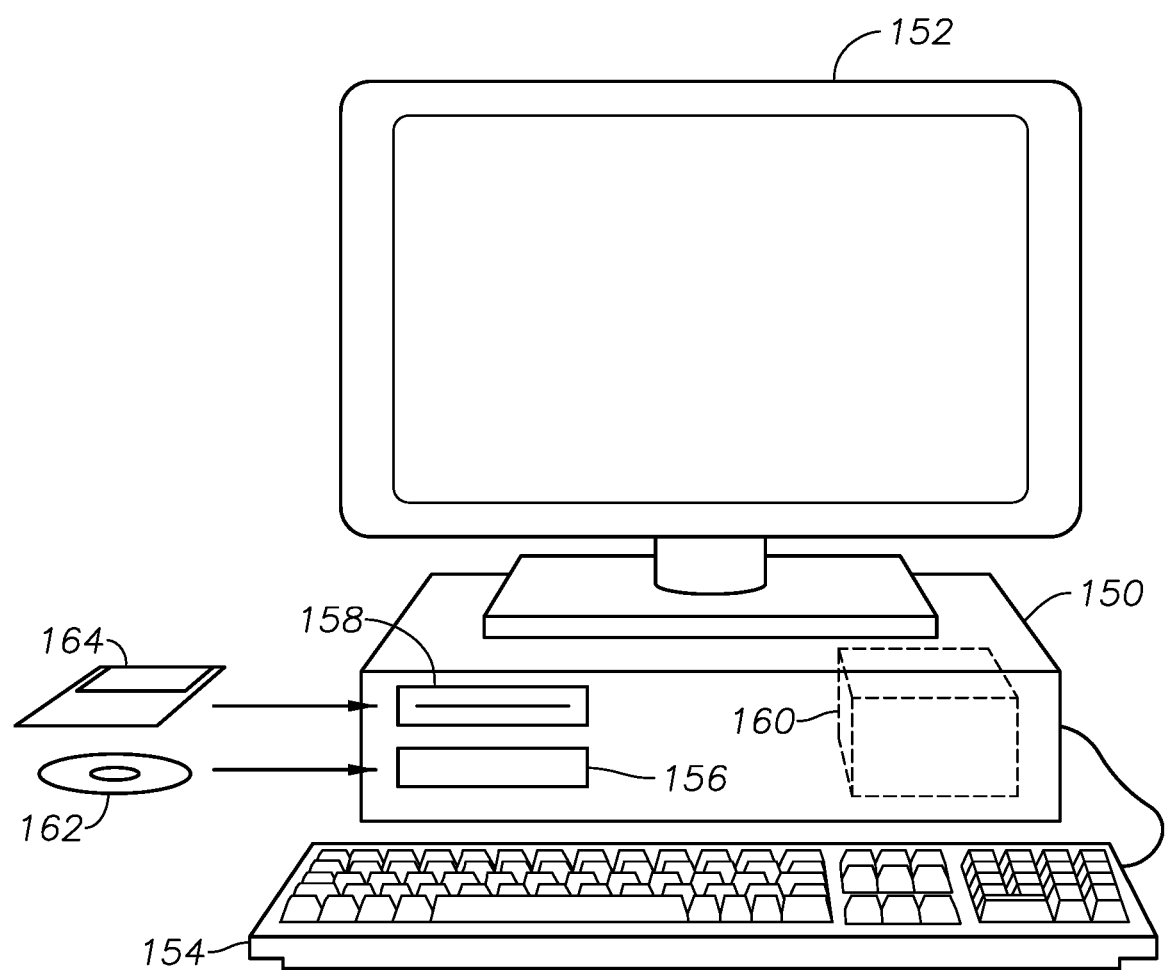
FIG. 10 shows a programmable computer and various forms of computer readable media, according to some example embodiments of the disclosure.

In another example embodiment, the invention relates to computer programs stored in computer readable media. Referring to FIG. 10, the foregoing process as explained with reference to FIGS. 1-7 can be embodied in computer-readable code. The code can be stored on, e.g., a computer readable medium, such as a floppy disk 164, CD-ROM 162 or a magnetic (or other type) hard drive 160 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. In one embodiment, the processor may be operably connected to the pressure gauges 318 and the fiber optics 316 to receive real-time measure data. The non-transitory computer-readable medium having computer executable instructions cause a computer or processor to perform the operations of analyzing pressure and rate data to determine permeability and fracture surface area by matching the pressure response at the injection/production and monitoring fracture pressure gauge, calibrating analytical/numerical simulation models, or by using physics-based proxy models introduced in previous sections.

Methods according to the invention provide estimates of permeability of subsurface rock formations and fracture surface area. Analytical models and physics-based proxy models used to determine permeability of extremely low permeability reservoirs and fracture surface area are disclosed. Example methods and systems to perform a pulse interference test in a hydraulically fractured horizontal well are disclosed.

There are several advantages of the proposed invention compared to conventional approaches in the industry. Since reservoir is only interrupted for a short period of time during a pulse interference test, initial condition of the reservoir is preserved. Therefore, risk for going above the fracturing pressure during an injection pulse or going below the saturation pressure during a production pulse is small compared to continuous injection/production tests.

Monitoring arrival of pressure front to adjacent fracture ensures that the volume in between the fractures is fully investigated. Therefore, confidence in estimating reservoir properties between these fractures will be higher than using one probe. In conventional tests, however, pressure is only monitored at injection point. Therefore, extent of investigation volume is an unknown. A neighbor perforation without a fracture may not serve the same purpose because it cannot reach deep into reservoir, which may result in wrong identification of pressure front if there is hydraulic connection between injection/production fracture and neighbor perforation through casing cement.

Reservoir permeability or fracture surface area can be predicted with shorter tests compared to conventional tests by building a proxy model and inputting monitored front/peak arrival time or peak pressure or matching the complete pressure observations by changing permeability and area in the calculations. If permeability is determined, then fracture surface area can be determined based on additional attributes of the pressure change. If fracture surface area is determined, then permeability can be determined independently by other methods. While total fracture surface area (propped and unpropped) can be determined if an injection test is conducted, effective surface area (propped) can be calculated if a production test The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system for determining permeability of a subsurface formation and fracture surface area, comprising:
   a first hydraulic fracture in the middle and a second and a third hydraulic fractures on both sides of the first fracture in a horizontal well;
   a first pump configured to generate a pressure pulse at the first hydraulic fracture;
   a first pressure gauge configured to monitor pressure at the first hydraulic fracture;
   a second pressure gauge configured to monitor the pressure at the second hydraulic fracture; and
   a third pressure gauge configured to monitor the pressure at the third hydraulic fracture; and
   a processor configured to:
      analyze pressure and rate data to determine at least one permeability and fracture surface area by using at least one of an analytical/numerical simulation model and a physics-based proxy model by inputting at least one of pressure front/peak arrival time and peak pressure,
      wherein if permeability is determined, then fracture surface area is determined based on a production test pressure change, and
      wherein if an injection test is implemented, then the determined fracture surface area corresponds to total surface area (propped and unpropped), and if a production test is implemented, then the determined fracture surface area corresponds to effective (propped) surface area.

2. The system of claim 1, wherein the injection or production rate at the first hydraulic fracture is maintained at a constant rate for a predetermined period of time and then shut in.

3. The system of claim 1, further comprising:
   one or more packer elements installed between the first hydraulic fracture and the second hydraulic fracture to isolate them hydraulically.

4. The system of claim 1, further comprising:
   one or more packer elements installed between the first hydraulic fracture and the third hydraulic fracture to isolate them hydraulically.

5. A method for determining permeability of a subsurface formation and fracture surface area, comprising:
   a. creating a first hydraulic fracture in the middle and a second and a third hydraulic fractures on both sides of the first fracture in a horizontal well;
   b. generating a pressure pulse at the first hydraulic fracture by injecting or producing at a specific rate for a predetermined period of time and then shut-in;
   c. monitoring, using a first pressure gauge, the pressure at the first hydraulic fracture;
   d. monitoring, using a second pressure gauge, the pressure at the second hydraulic fracture;
   e. monitoring, using a third pressure gauge, the pressure at the third hydraulic fracture
   f. repeating steps (a)-(d) at different locations along the wellbore;
   g. evaluating heterogeneity in permeability and variation of fracture surface area created along the wellbore based on steps (a)-(e); and
   h. analyzing pressure and rate data to determine at least one of permeability and fracture surface area by using at least one of an analytical/numerical simulation model and physics-based proxy model by inputting at least one of pressure front/peak arrival time and peak pressure, and wherein if an injection test is implemented, then the determined fracture surface area corresponds to total surface area (propped and unpropped), and if a production test is implemented, then the determined fracture surface area corresponds to effective (propped) surface area.

6. The method of claim 5, further comprising:
installing one or more packer elements between the first hydraulic fracture and the second hydraulic fracture to isolate them hydraulically.

7. The method of claim 5, further comprising:
installing one or more packer elements between the first hydraulic fracture and the third hydraulic fracture to isolate them hydraulically.

8. The method of claim 5, further comprising:
installing fiber optics comprising a distributed acoustic sensor (DAS) or a distributed temperature sensor (DTS) at each of the hydraulic fractures.

9. The method of claim 5, further comprising:
prior to generating the pressure pulse at the first hydraulic fracture, normalizing the initial reservoir pressure.

10. The method of claim 5, wherein the subsurface formation comprises at least one of shale, limestone, and sandstone.

11. The method of claim 1, wherein the permeability is determined from an arrival time of a normalized pressure signal.

12. The method of claim 1, further comprising monitoring pressure responses at neighbor fractures and quantifying heterogeneity based on differences between the pressure responses.

* * * * *